US011656946B2

United States Patent
Shaw

(10) Patent No.: US 11,656,946 B2
(45) Date of Patent: *May 23, 2023

(54) CLOUD-NATIVE GLOBAL FILE SYSTEM WITH RESHAPABLE CACHING

(71) Applicant: Nasuni Corporation, Boston, MA (US)

(72) Inventor: David M. Shaw, Newton, MA (US)

(73) Assignee: Nasuni Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/335,897

(22) Filed: Jun. 1, 2021

(65) Prior Publication Data
US 2022/0058133 A1 Feb. 24, 2022

Related U.S. Application Data

(63) Continuation of application No. 16/936,787, filed on Jul. 23, 2020, now Pat. No. 11,023,384.

(60) Provisional application No. 62/877,365, filed on Jul. 23, 2019.

(51) Int. Cl.
| | |
|---|---|
| *G06F 11/00* | (2006.01) |
| *G06F 11/14* | (2006.01) |
| *G06F 12/0895* | (2016.01) |
| *G06F 3/06* | (2006.01) |
| *G06F 9/4401* | (2018.01) |

(52) U.S. Cl.
CPC ........ *G06F 11/1435* (2013.01); *G06F 3/0604* (2013.01); *G06F 3/0644* (2013.01); *G06F 3/0689* (2013.01); *G06F 9/4403* (2013.01); *G06F 12/0895* (2013.01); *G06F 2212/1041* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 2002/0138559 A1* | 9/2002 | Ulrich | G06F 16/10 711/114 |
| 2004/0133743 A1* | 7/2004 | Ito | G06F 11/1096 711/170 |
| 2010/0332401 A1* | 12/2010 | Prahlad | G06F 16/1844 711/E12.001 |

(Continued)

OTHER PUBLICATIONS

Google Scholar/Patents search—text refined (Year: 2022).*

*Primary Examiner* — Christopher S McCarthy
(74) *Attorney, Agent, or Firm* — David H. Judson

(57) ABSTRACT

A cloud-native global file system in which a local filer creates objects and forward them to a cloud-based object store is augmented to include a reshapable caching scheme for the local filer. Like striped caches, the approach uses a stripe, but the striping is implemented via a true RAID 0 (disk striping) rather than as a striped LV (logical volume) device. This approach allows for a "reshape" operation to convert from a n-way stripe set to a n+1-way stripe set. Preferably, a reshape involves redistributing each block on disk to its new calculated home. For example, going from a single disk to a two disk set would move every other block from disk 1 to disk 2, and rearrange the blocks on disk 1 to fill in the "holes". Performance after the reshape matches that of a striped cache. In one embodiment, the cache is structured as a "degraded" RAID 4.

4 Claims, 4 Drawing Sheets

(56) References Cited

U.S. PATENT DOCUMENTS

2020/0133527 A1\* 4/2020 Zhao .................. G06F 3/067
2020/0183838 A1\* 6/2020 Henson ............... G06F 12/0804

\* cited by examiner

CLOUD-NATIVE GLOBAL FILE SYSTEM WITH RESHAPABLE CACHING

BACKGROUND OF THE INVENTION

Technical Field

This application relates generally to data storage.

Background of the Related Art

It is known to provide a cloud-native global file system that is used to provide primary file storage for enterprise data. In this approach, edge appliances (or "filers") typically located on-premises securely transmit all files, file versions and metadata to a preferred private or public cloud object store, while locally caching only active files. The appliances are stateless, and multiple appliances can mount the same volume in the cloud. As files are written locally, an authoritative copy of every file and metadata (inodes) are stored in the cloud. The system provides a single, unified namespace for all primary file data that is not bound by local hardware or network performance constraints. The above-described approach to enterprise file services also has been extended to provide multiple-site/multiple-filer access to the same namespace, thereby enabling participating users with the ability to collaborate on documents across multiple filers/sites. A system of this type is available commercially from Nasuni® Corporation of Boston, Mass.

A filer in the above-described system typically includes a local cache that is managed across a set of drives. In one caching scheme, the drives are striped. Striping means that individual disk chunks (the "stripe size") are arranged to spread out data across all of the disks, such that the first block lives on the first disk, the second block lives on the second disk, and so on. Disk striping is sometimes referred to as a RAID 0 scheme. RAID refers to a redundant array of independent disks. This approach allows the system to operate irrespective of any single-disk size cache limit, and striping facilitates performance improvement as multiple cache disks can be interacted with concurrently. For example, if blocks 0-3 are being read and there is a 4 disk stripe set, all 4 blocks can be read concurrently. The operating system kernel knows the dimensions (sometimes called the "shape") of the stripe set, and it automatically schedules concurrent reads across the various devices to maximize performance. The local filesystem is also aware of the RAID shape, and it arranges its internal data structures to spread out across the stripe set and not concentrate frequently-accessed data structures on a single device, to avoid creating a hot spot, which would negatively impact performance. Overall performance is ideally that of all disks taken together (though somewhat lower in practice), as all disks contribute to the overall I/O.

While the striping approach has advantages (e.g., new devices can be added, existing devices can be expanded, improved performance over a single cache disk or a set of scalable cache disks, etc.), there are also drawbacks. In particular, while existing devices can be expanded at any time, up until the hypervisor limit, all disks of the stripe set must be equally expanded to be useful. For example, a three-disk stripe set where two of the disks are 4 TB and one of the disks is 6 TB results in a 12 TB cache and not a 14 TB cache, as 2 TB of the 6 TB disk cannot be used. Another drawback is that all new devices must be added in multiples of the stripe width. So, if the cache starts with a 3-disk stripe set, new devices must be added in units of 3. Most significantly, because the filesystem needs to be aware of the cache shape in order to lay out the internal data structures, the final striping step is to format the cache. This means the only way to stripe an existing filer is to either delete the cache or to perform disaster recovery (DR). A further problem is that filer must be offline during the stripe operation.

BRIEF SUMMARY

According to this disclosure, a new type of caching scheme is implemented, referred to as "reshapable" caching. Like striped caches, the approach uses a stripe, but the striping is implemented via a true RAID 0 rather than as a striped LV (logical volume) device. RAID 0 (disk striping) is the process of dividing a body of data into blocks and spreading the data blocks across multiple storage devices, such as hard disks or solid-state drives (SSDs), in a redundant array of independent disks (RAID) group. A stripe consists of the data divided across the set of hard disks or SSDs, and a striped unit refers to the data slice on an individual drive. This approach allows for a "reshape" operation to convert from a n-way stripe set to a n+1-way stripe set. Preferably, a reshape involves redistributing each block on disk to its new calculated home. For example, going from a single disk to a two disk set would move every other block from disk 1 to disk 2, and rearrange the blocks on disk 1 to fill in the "holes". Performance after the reshape matches that of a striped cache.

In one embodiment, the approach herein takes advantage of the fact that RAID 4 (being several disks of striped data, plus one disk of parity data used to reconstruct the RAID array in case of disk failure) can be considered a RAID 0 (the aforementioned "several disks of striped data") plus a parity disk. A RAID 4 missing its parity disk (a "degraded" RAID 4) has the same characteristics as a RAID 0, and for all intents and purposes can be treated as a RAID 0. This allows for simple reshape operations; in particular, while reshaping a RAID 0 is not always supported by commercial RAID implementations, reshaping a RAID 4 is more frequently supported.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
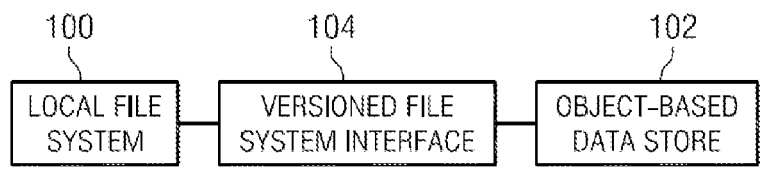
FIG. 1 is a block diagram illustrating how a known versioned file system interfaces a local file system to an object-based data store.

FIG. 1 illustrates a local file system 100 and an object-based data store 102. Although not meant to be limiting, preferably the object-based data store 102 is a "write-once" store and may comprise a "cloud" of one or more storage service providers. An interface 104 (or "filer") provides for a "versioned file system" that only requires write-once behavior from the object-based data store 102 to preserve substantially its "complete" state at any point-in-time. As used herein, the phrase "point-in-time" should be broadly construed, and it typically refers to periodic "snapshots" of the local file system (e.g., once every "n" minutes). The value of "n" and the time unit may be varied as desired. The interface 104 provides for a file system that has complete data integrity to the cloud without requiring global locks. In particular, this solution circumvents the problem of a lack of reliable atomic object replacement in cloud-based object repositories. The interface 104 is not limited for use with a particular type of back-end data store. When the interface is positioned in "front" of a data store, the interface has the effect of turning whatever is behind it into a "versioned file system" ("VFS"). The VFS is a construct that is distinct from the interface itself, and the VFS continues to exist irrespective of the state or status of the interface (from which it may have been generated). Moreover, the VFS is self-describing, and it can be accessed and managed separately from the back-end data store, or as a component of that data store. Thus, the VFS (comprising a set of structured data representations) is location-independent. In one embodiment, the VFS resides within a single storage service provider (SSP) although, as noted above, this is not a limitation. In another embodiment, a first portion of the VFS resides in a first SSP, while a second portion resides in a second SSP. Generalizing, any given VFS portion may reside in any given data store (regardless of type), and multiple VFS portions may reside across multiple data store(s). The VFS may reside in an "internal" storage cloud (i.e. a storage system internal to an enterprise), an external storage cloud, or some combination thereof.

The interface 104 may be implemented as a machine. A representative implementation is the Nasuni® Filer, available from Nasuni® Corporation of Boston, Mass. Thus, for example, typically the interface 104 is a rack-mounted server appliance comprising hardware and software. The hardware typically includes one or more processors that execute software in the form of program instructions that are otherwise stored in computer memory to comprise a "special purpose" machine for carrying out the functionality described herein. Alternatively, the interface is implemented as a virtual machine or appliance (e.g., via VMware®, or the like), as software executing in a server, or as software executing on the native hardware resources of the local file system. The interface 104 serves to transform the data representing the local file system (a physical construct) into another form, namely, a versioned file system comprising a series of structured data representations that are useful to reconstruct the local file system to any point-in-time. A representative VFS is the Nasuni Unity File System (UniFS™). Although not meant to be limiting, preferably each structured data representation is an XML document (or document fragment). As is well-known, extensible markup language (XML) facilitates the exchange of information in a tree structure. An XML document typically contains a single root element (or a root element that points to one or more other root elements). Each element has a name, a set of attributes, and a value consisting of character data, and a set of child elements. The interpretation of the information conveyed in an element is derived by evaluating its name, attributes, value and position in the document.

The interface 104 generates and exports to the write-once data store a series of structured data representations (e.g., XML documents) that together comprise the versioned file system. The data representations are stored in the data store. Preferably, the XML representations are encrypted before export to the data store. The transport may be performed using known techniques. In particular, REST (Representational State Transfer) is a lightweight XML-based protocol commonly used for exchanging structured data and type information on the Web. Another such protocol is Simple Object Access Protocol (SOAP). Using REST, SOAP, or some combination thereof, XML-based messages are exchanged over a computer network, normally using HTTP (Hypertext Transfer Protocol) or the like. Transport layer security mechanisms, such as HTTP over TLS (Transport Layer Security), may be used to secure messages between two adjacent nodes. An XML document and/or a given element or object therein is addressable via a Uniform Resource Identifier (URI). Familiarity with these technologies and standards is presumed.

Figure 2:
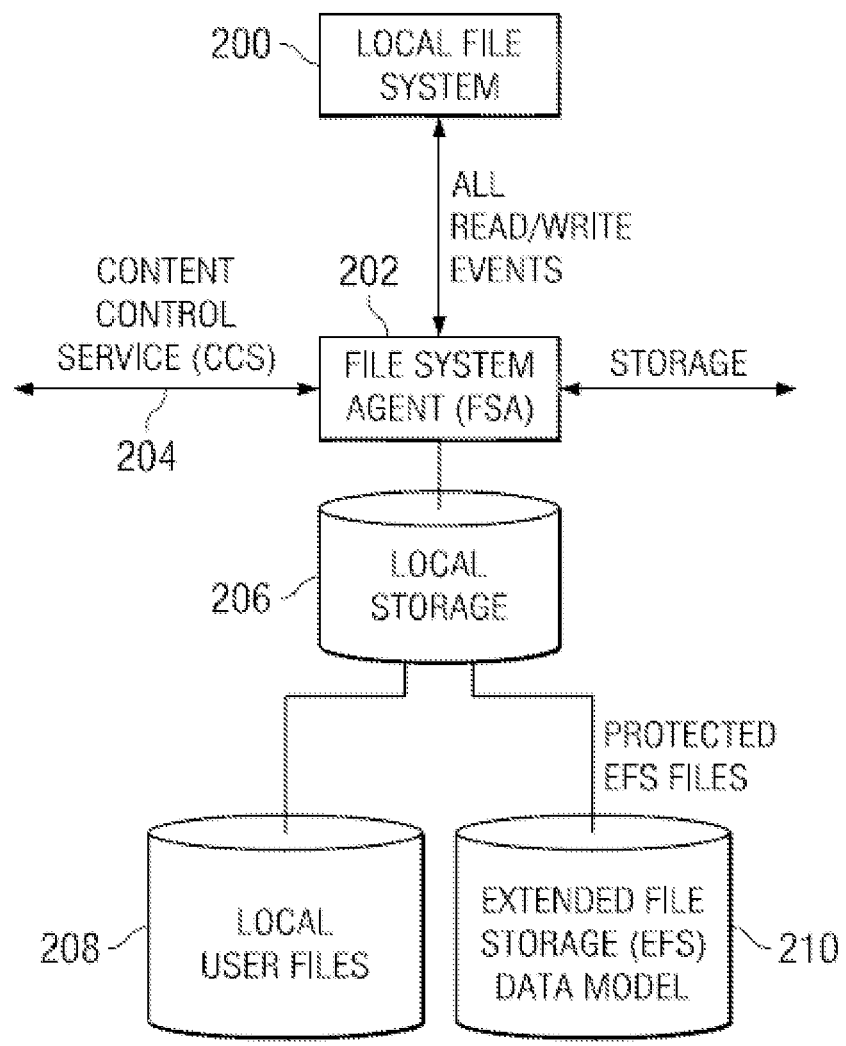
FIG. 2 is a block diagram of a representative implementation of a portion of the interface shown in FIG. 1.

FIG. 2 is a block diagram of a representative implementation of how the interface captures all (or given) read/write events from a local file system 200. In this example implementation, the interface comprises a file system agent 202 that is positioned within a data path between a local file system 200 and its local storage 206. The file system agent 202 has the capability of "seeing" all (or some configurable set of) read/write events output from the local file system. The interface also comprises a content control service (CCS) 204 as will be described in more detail below. The content control service is used to control the behavior of the file system agent. The object-based data store is represented by the arrows directed to "storage" which, as noted above, typically comprises any back-end data store including, without limitation, one or more storage service providers. The local file system stores local user files (the data) in their native form in cache 208. Reference numeral 210 represents that portion of the cache that stores pieces of metadata (the structured data representations, as will be described) that are exported to the back-end data store (e.g., the cloud).

Figure 3:
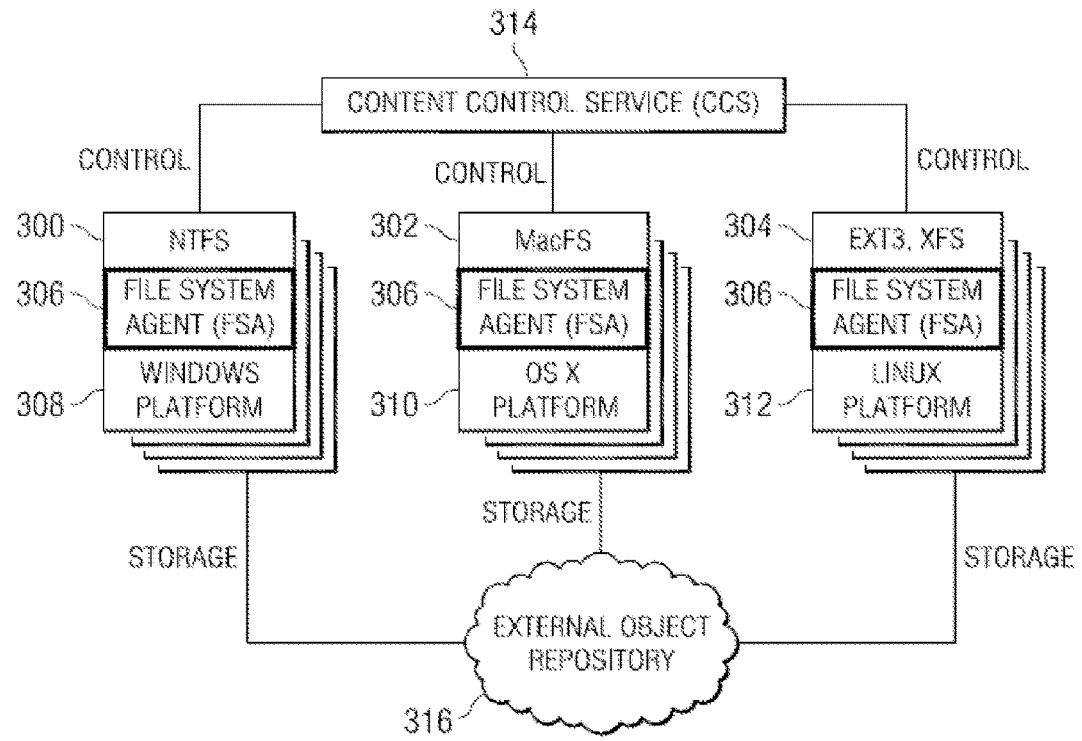
FIG. 3 is a more detailed implementation of the interface where there are a number of local file systems of different types.

FIG. 3 is a block diagram illustrating how the interface may be used with different types of local file system architectures. In particular, FIG. 3 shows the CCS (in this drawing a Web-based portal) controlling three (3) FSA instances. Once again, these examples are merely representative and they should not be taken to limit the invention. In this example, the file system agent 306 is used with three (3) different local file systems: NTFS 300 executing on a Windows operating system platform 308, MacFS (also referred to as "HFS+" (HFSPlus)) 302 executing on an OS X operating system platform 310, and EXT3 or XFS 304 executing on a Linux operating system platform 312. These local file systems may be exported (e.g., via CIFS, AFP, NFS or the like) to create a NAS system based on VFS. Conventional hardware, or a virtual machine approach, may be used in these implementations, although this is not a limitation. As indicated in FIG. 3, each platform may be controlled from a single CCS instance 314, and one or more external storage service providers may be used as an external object repository 316. As noted above, there is no requirement that multiple SSPs be used, or that the data store be provided using an SSP.

Figure 4:
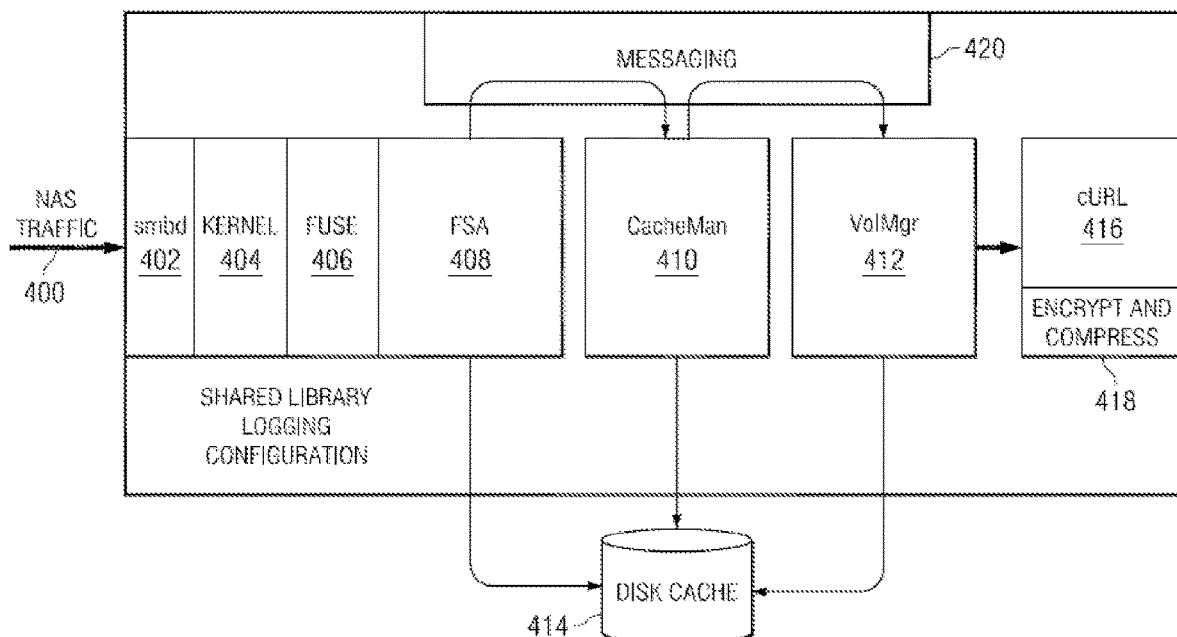
FIG. 4 illustrates the interface implemented as an appliance within a local processing environment.

FIG. 4 illustrates the interface implemented as an appliance within a local processing environment. In this embodiment, the local file system traffic 400 is received over Ethernet and represented by the arrow identified as "NAS traffic." That traffic is provided to smbd layer 402, which is a SAMBA file server daemon that provides CIFS (Windows-based) file sharing services to clients. The layer 402 is managed by the operating system kernel 404 is the usual manner. In this embodiment, the local file system is represented (in this example) by the FUSE kernel module 406 (which is part of the Linux kernel distribution). Components 400, 402 and 404 are not required to be part of the appliance. The file transfer agent 408 of the interface is associated with the FUSE module 406 as shown to intercept the read/write events as described above. The CCS (as described above) is implemented by a pair of modules (which may be a single module), namely, a cache manager 410, and a volume manager 412. Although not shown in detail, preferably there is one file transfer agent instance 408 for each volume of the local file system. The cache manager 410 is responsible for management of "chunks" with respect to a local disk cache 414. This enables the interface described herein to maintain a local cache of the data structures (the structured data representations) that comprise the versioned file system. The volume manager 412 maps the root of the FSA data to the cloud (as will be described below), and it further understands the one or more policies of the cloud storage service providers. The volume manager also provides the application programming interface (API) to these one or more providers and communicates the structured data representations (that comprise the versioned file system) through a transport mechanism 416 such as cURL. cURL is a library and command line tool for transferring files with URL syntax that supports various protocols such as FTP, FTPS, HTTP, HTTPS, SCP, SFTP, TFTP, TELNET, DICT, LDAP, LDAPS and FILE. cURL also supports SSL certificates, HTTP POST, HTTP PUT, FTP uploading, HTTP form based upload, proxies, cookies, user+password authentication, file transfer resume, proxy tunneling, and the like. The structured data representations preferably are encrypted and compressed prior to transport by the transformation module 418. The module 418 may provide one or more other data transformation services, such as duplicate elimination. The encryption, compression, duplicate elimination and the like, or any one of such functions, are optional. A messaging layer 420 (e.g., local socket-based IPC) may be used to pass messages between the file system agent instances, the cache manager and the volume manager. Any other type of message transport may be used as well.

The interface shown in FIG. 4 may be implemented as a standalone system, or as a managed service. In the latter case, the system executes in an end user (local file system) environment. A managed service provider provides the system (and the versioned file system service), preferably on a fee or subscription basis, and the data store (the cloud) typically is provided by one or more third party service providers. The versioned file system may have its own associated object-based data store, but this is not a requirement, as its main operation is to generate and manage the structured data representations that comprise the versioned file system. The cloud preferably is used just to store the structured data representations, preferably in a write-once manner, although the "versioned file system" as described herein may be used with any back-end data store.

As described above, the file system agent 408 is capable of completely recovering from the cloud (or other store) the state of the native file system and providing immediate file system access (once FSA metadata is recovered). The FSA can also recover to any point-in-time for the whole file system, a directory and all its contents, a single file, or a piece of a file. These and other advantages are provided by the "versioned file system" of this disclosure, as it now described in more detail below.

For more details concerning the filer as described above, the disclosure of U.S. Pat. No. 9,575,841 is hereby incorporated by reference.

Figure 5:
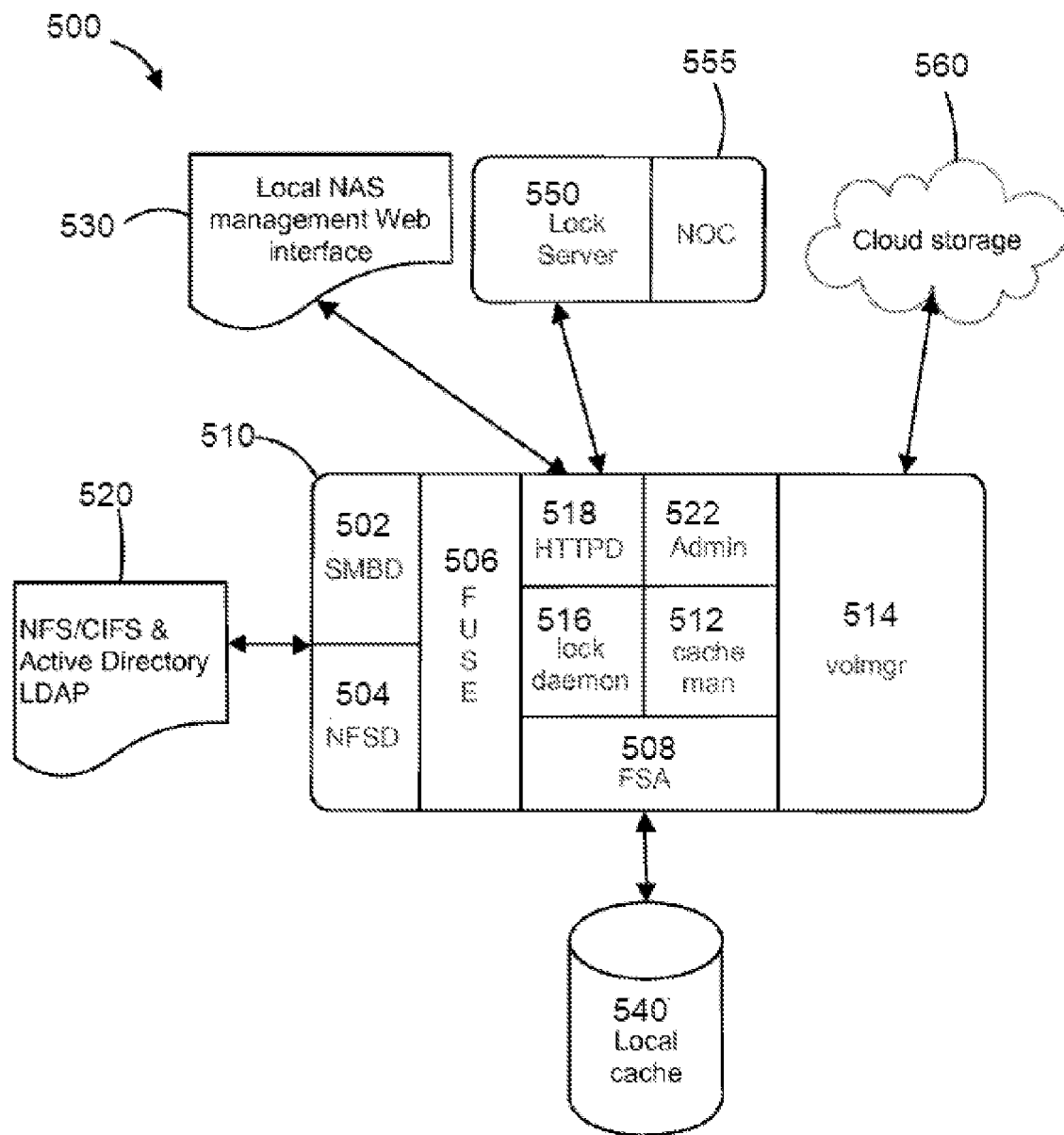
FIG. 5 describes further details of a versioned file system in which the techniques of this disclosure may be implemented.

FIG. 5 is a block diagram that illustrates a system 500 for managing a versioned file system (as described above) that also includes the capability of global locking. The system 500 includes an interface 510 in communication with local traffic 520, a web-based portal 530, a local cache 540, a lock server 550, and cloud storage 560. The interface 510 includes a SMBD layer 502, a NFSD layer 504, a FUSE module 506, a FSA 508, a cache manager 512, a volume manager 514, a lock daemon 516, a transport layer 518, and an administrative module 522. In some embodiments, the interface 510 is the same as the interface described with respect to FIG. 4 but with the addition of the lock daemon 516.

SMB/CIFS lock requests are intercepted by SMBD layer 502, which is a SAMBA file server daemon. An optional Virtual File System (VFS) module can extend the SAMBA server daemon to send the local lock information to the FSA 508. FSA 508 then communicates with FUSE 506 to coordinate the FUSE file descriptors (pointers) with the ioctl information to determine a path for the given file(s) associated with the lock request. Assuming a path is enabled for global locking, FSA 508 sends the lock and path to the lock daemon 516, which handles the lock request as described below. If a path is not enabled for global locking, the lock request stays within the SAMBA server as it did previously (e.g., conflict management, etc. as described above) and it is not sent to the lock daemon 516.

NFS lock requests are passed through the NFSD layer 504 to FUSE 506. Assuming a path prefix is enabled for global locking, FSA 508 communicates with the lock daemon 516 to handle the lock request using a common protocol, as described above. If the path prefix is not enabled for global locking, FSA 508 handles the lock request as it did previously (e.g., conflict management, etc. as described above) and the lock request is not sent to the lock daemon 516.

The lock daemon 516 is responsible for local lock management and coordinating with the global lock server. The lock daemon 516 can perform one or more of the following functions: (a) translating the lock format; (b) communicating with the centralized lock server; (c) acquiring locks; (d) lock peeking; (e) lock re-acquiring; (f) lock releasing; and (g) communicating with the filer.

With respect to translating the lock format, the lock daemon 516 can translate the local file lock requests to a common lock format understood by the centralized lock server 550 (described below). Using this approach, the lock server 550 receives a lock request in one format regardless of the underlying network protocol (e.g., SMB/CIFS or NFS). The centralized lock server 550 can be in a network operations center (NOC) 555.

The lock daemon 516 can then communicate with the centralized lock server 550 by making calls to a Centralized Lock API. Through the API, the lock daemon 516 can execute a lock request, an unlock request, and/or a lock break request. A lock request generally requires the transmission of certain information such as the first handle (a unique identifier to the original base object for the file), the requested lock mode, the file path, the protocol of the requester, etc. Additional information such as timestamps and serial number can be included in the lock request. The requested lock mode is the type of access for the lock, such as a shared or exclusive lock, a lock for read, a lock for write, lock for exclusive write, lock for shared write. If the centralized lock server 550 grants the lock request, the lock server 550 then uses information provided in the lock request (e.g., the first handle) to retrieve the latest version of the requested file from cloud storage 560. The centralized lock server 550 transmits the latest version of the requested file to the lock daemon 516, which can store the file in local cache 540.

An unlock request can include the same or similar information as the lock request but with an updated handle name that was generated as a result of modifications to the locked file. A lock break request can be provided by a system administrator to manually unlock a file (e.g., if a user leaves a locked file open overnight, a server goes down, etc.).

Prior to making a new lock request, the lock daemon 516 determines whether a lock already exists in local cache 540 or on the centralized lock server 550. If no lock exists in either of those locations, the lock daemon 516 acquires a new lock through the centralized lock server 550. The new lock can have a lock mode computed using the requested access and share profiles (masks).

Lock peeking can be initiated every time a file is opened for read. In lock peeking, the lock daemon 516 can query whether a lock exists on the file prior to opening the file. If a lock exists, the lock daemon 516 can also determine the associated lock mode to evaluate whether the lock mode permits the user to open the file. The lock daemon 516 retrieves this information from local lock cache 540 if the filer requesting the lock peek already has a write lock on the file. Otherwise, the lock daemon 516 retrieves this information from the centralized lock server 550. Each lock peek request can be cached in the local lock cache 540 for a short time period (e.g., several seconds) to reduce traffic to the central lock server 550 if the lock daemon 516 receives a new lock peek request shortly after the first lock peek request.

For example, another user may have a lock for exclusive write access to the file that does not allow any shared access (i.e., no shared read access). In this example, the lock daemon 516 determines from the lock query that the file cannot be opened due to an existing lock on the file. In another example, the lock mode can allow shared read or write access in which case the lock daemon 516 determines from the lock query that the file can be opened.

During lock peeking, the lock daemon 516 can also retrieve additional information about the file, such as the file handle, handle version, first handle, and lock push version. The file handle is a pointer to the latest version of the file in the cloud. The handle version is a version of the file in the cloud. The first handle provides a unique identifier to the file across versions and renames of the file. The lock push version is the latest version of the file that was sent to the cloud.

The lock daemon 516 can cache locks and unlocks in a local lock cache 540 for release to the centralized lock server 550. If a lock request is made for a file that has a cached unlock request, the lock can be reestablished without having to acquire a new lock from the centralized lock server 550. In such a situation, the unlock request is cancelled. This caching can reduce load on the lock server 550 and improve response time. In general, the unlock requests are cached for a certain period of time prior to release to the lock server 550 to allow for such lock reestablishment.

As discussed above, the lock request includes information on the protocol (e.g., SMB/CIFS or NFS) of the requester and the lock mode. The lock server 550 receives this information and can determine, based on any existing lock(s) on the requested file, whether the lock server 550 can issue multiple locks on the same file. The lock server 550 can evaluate the protocol used by the requester of the existing lock and the associated access/share permissions of that lock and determine whether protocol used with the new lock requester is compatible.

In addition, the lock daemon 516 handles lock releases. In some embodiments, the lock daemon 516 does not immediately send the lock release to the lock server 550. This time delay can reduce load on the centralized lock server 550 because files are frequently locked and unlocked in rapid succession, as discussed above. Before a lock is released, if the file was changed, the current data is sent to cloud storage 560 (e.g., Amazon S3, Microsoft Azure, or other public or private clouds) so the most recent data is available to the next locker.

Finally, the lock daemon 516 can communicate with the FSA 508. The lock daemon 516 can receive lock requests and/or lock peek requests from FSA 508, which the lock daemon 516 translates into a common protocol for transmission to the centralized lock server 550, as discussed above. The lock daemon can also pass the updated handle name to the FSA 508 to perform a file-level snapshot before unlocking a file and/or a file level merge/synchronization before locking a file.

For global locking, it is desirable for the locker to have the most recent version of the file associated with the lock request (and lock grant). To accomplish this, the cache manager 512 can be configured to snapshot a single file (e.g., the file associated with the lock request) without triggering a copy-on-write (COW) event (which would cause a version update, as discussed above) and without affecting other snapshot operations. After a single file snapshot, the cache manager 512 can mark all parent directories of the file as changed or "dirty." In addition, the fault manager algorithm can be configured to fault a single file based on requests from the FSA 508.

The merge/push algorithm can be modified to provide for merging single files. Before the locked file is pushed to the local cache 540, the NOC 555 assigns a unique lock version (e.g., 64 bit) to the file. The lock version can be used by FSA 508 to determine whether a locked file or its metadata is dirty (i.e., changed). The parent directories of the locked file can continue to use the existing write version assigned from the last TOC. Thus, FSA 508 can track two values: lock_write_version and lock_push_version. When a file or directory is dirtied, the lock_write_version is updated. When a file or directory is pushed to local cache 540, the lock_push_version is updated.

As discussed above, the file data from the NOC 555 (or centralized lock server 550) is merged into the local cache 540 before the FSA 508 returns control of the file to the client. To determine if the file data in the NOC 555 is newer than the file data in the cache 540 (e.g., if the lock is retrieved while an unlock request is cached), the FSA checks MAX (lock_write_version, lock_push_version) against the NOC lock version. If the NOC lock version is greater than the lock_write_version and the lock_push_version, the file data (object metadata and data) from the NOC 555 is used to instantiate the object (locked file) in the local cache 540.

If the file data in the cache 540 is newer, then the file data from the NOC 555 is discarded. In the circumstance where the NOC 555 indicates that the file is deleted, the delete version is compared to the local cache 540 version in order to apply the delete to the local cache 540.

In addition, the merge/push algorithm can be modified to reconcile the single-file merges of locked files with the snapshot merges of files. Any file that was "fastsynched" through the FSA 508 (i.e., locked) or "fastpushed" to the cloud (i.e., unlocked) is designated as "cloud fastsynced." When merging an object or file that is considered "cloud dirty" or "cloud fastsynched," the FSA 508 will update the file if the incoming lock_push_version is greater than MAX (lock_write_version, lock_push_version), as discussed above. If the incoming lock_push_version is less than MAX (lock_write_version, lock_push_version), the cache object is considered newer and the incoming update is discarded by the FSA 508. Also, when a file is missing (deleted) from the pushed version but the file is also locally fastsynched, the file will not be deleted. This merging can occur concurrently or before the global lock on the file is granted.

In addition, if a file has been deleted or renamed, the local cache metadata can record a "delete tombstone" which includes certain information (e.g., parent first handle, lock version, name, etc.). FSA 508 merges a file as new if the file is newer than any delete tombstone contained in the cache for the unique file. This can address the situation in which a file has been fast synchronized before merge. In that case, the incoming cloud dirty file is old compared to the cache and the import is discarded.

To ensure that the unlocked file includes the changes from the latest version, the locked file can only be unlocked when the lock_push_version is greater than or equal to the lock_write_version at which point the FSA 508 sends the lock_push_version back to the NOC 555 (or centralized lock server 550) to store the new version of the file in cloud storage 560.

In some embodiments, the interface 510 snapshots and merges new files at the time of creation. The new file requests can be stored on the lock server 550 with the lock entries. Other users can poll the lock server 550 to determine if new files/objects exist that have not yet been populated to the cloud 560, for example if there are new files/objects in a given directory. After the new files have been created, the locker server 550 can merge the new file requests into the appropriate directories in the cloud 560.

The filers may be anywhere geographically, and no network connectivity between or among the filers is required (provided filers have a connection to the service).

Sharing enables multi-site access to a single shared volume. The data in the volume is 100% available, accessible, secure and immutable. The approach has infinite scalability and eliminates local capacity constraints. The sites (nodes) may comprise a single enterprise environment (such as geographically-distributed offices of a single enterprise division or department), but this is not a requirement, as filers are not required to comprise an integrated enterprise. This enables partners to share the filesystem (and thus particular volumes therein) in the cloud. Using the service provider-supplied interfaces, which are preferably web-based, the permitted users may set up a sharing group and manage it. Using the sharing approach as described, each member of the sharing group in effect "sees" the same volume.

Thus, any point-in-time recovery of the shared volume is provided, and full read/write access is enabled from each node in the sharing group.

Reshapable Caching

RAID 0 (disk striping) is the process of dividing a body of data into blocks and spreading the data blocks across multiple storage devices, such as hard disks or solid-state drives (SSDs), in a redundant array of independent disks (RAID) group. A stripe consists of the data divided across the set of hard disks or SSDs, and a striped unit refers to the data slice on an individual drive.

According to this disclosure, a new type of caching scheme is implemented, referred to as "reshapable" caching. Like striped caches, the approach uses a stripe, but the striping is implemented via a true RAID 0 rather than as a striped LV (logical volume) device. This approach allows for a "reshape" operation to convert from a n-way stripe set to a n+1-way stripe set. Preferably, a reshape involves redistributing each block on disk to its new calculated home. For example, going from a single disk to a two disk set would move every other block from disk 1 to disk 2, and rearrange the blocks on disk 1 to fill in the "holes". Performance after the reshape matches that of a striped cache.

Figure 6:
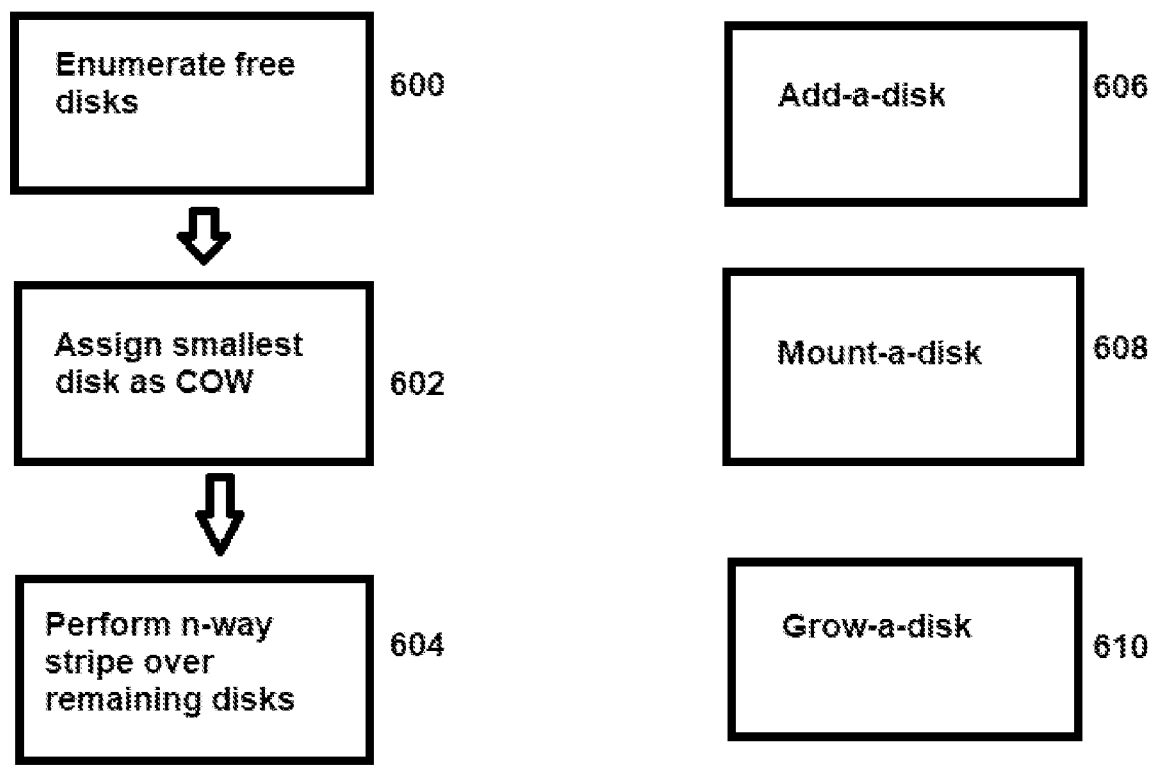
FIG. 6 depicts a reshapable caching technique of this disclosure.

A preferred technique works as follows. FIG. 6 depicts these operations.

The process begins on first boot of a virtual machine (VM). At step 600, all free devices are enumerated. At step 602, a smallest disk is then assigned to be a copy-on-write (COW) disk. An n-way stripe over all remaining disks, using as much of those disks as possible, is then created at step 604. This approach handles a common one-cache one-COW case automatically. In particular, the single disk cache is a RAID0 with a single device in it. It does not handle the case where the requirement (for example) is for a 200 GB cache made up of, say, 4 50 GB disks, and a 100 GB COW. In that case, one solution would be to provide a 200 GB cache made up of 3 50 GB disks, a 100 GB disk that is halfway used, and a 50 GB COW. An algorithm may also be implemented to see if there are multiple disks of the same size, which then are pooled for the cache and then taking any outlier as the COW, or failing to find an outlier, taking one of the pool disks.

When a new device that will be striped is added alongside the other devices, an add-a-disk process is executed. This is step 606. To this end, the device is added via a command mdadm grow. The command vgextend is executed to pick up the new space in the storage VG. A reboot is then initiated.

To mount the cache, a mount-a-disk process (i.e. run at boot time) is executed. This is step 608. In particular, the number of devices are counted, and a correct stripe width (swidth) parameter is derived. The cache is then mounted with the correct swidth. A grow-a-disk process is then executed.

The grow-a-disk process (i.e. making one or more of the existing disks larger) is step 610. In particular, command mdadm is executed to grow to extend the RAID 0 to its maximum size. A warning is logged if there is wasted space (i.e. the 4 TB+4 TB+6 TB example above). Then, pvreseize is executed to size the RAID 0 to its maximum size, and lvresize the cache to its maximum size. The command xfs_growfs is then executed to expand the XFS filesystem into the new space.

The above-identified commands are Linux operating system (OS) kernel commands.

The above-described processes (e.g., operations 600-610) are implemented in software executed by one or more processors.

The technique herein provides significant advantages. New devices can be added so customers can grow the cache as needs grow. There is a per-hypervisor disk count limit, but it is large. Existing devices can be expanded at any time, up until the per-hypervisor limit. Better performance than can be achieved with a single cache disk or a set of scalable cache disks. Customers can set this up on their own without support/Professional Services (PS) assistance. The filer can be online and serving clients during the add operation. New devices can be added in a quantity without being a multiple of the stripe width. There is no "initial" striping step—any cache can have additional devices added to it, even with the cache already in use.

When a customer sets up a filer, the cache on the filer is provisioned in a particular manner to facilitate the cache reshaping according to this disclosure. In particular, the filer cache is provisioned (as a minimal configuration) either as a single disk RAID 0, or a degraded RAID 4. Normally, the cache is configured as a logical volume overlaying a logical volume group on top of a physical volume. With this additional provisioning, the single disk RAID 0 or degraded RAID 4 support is made available if and when later needed as an improved alternative to the basic physical volume. To that end, when the customer then adds another disk, the filer receives an indication that the new disk has been added, and the cache reshaping is carried out by the filer as needed. The cache reshaping occurs without the customer having to erase and re-load its data, so can be done "live" while the filer continues serving user data.

Stated another way, the technique herein (involving initial provisioning of the cache as single disk RAID 0 or degraded RAID 4, and the automated cache reshaping that occurs in response to receipt of an indication of the customer adding a disk) enables the customer's data in the filer cache to be automatically re-organized to better utilize the new disk together with the existing disk(s), and much more efficiently as compared to the alternative of simply concatenating storage (disks).

Variants

The grow-a-disk process may be done live and without rebooting, by including code to scan the disk SCSI bus and trigger grow-a-disk if any of the disk sizes change. Many hypervisors (including VMware) allow changing disk sizes without powering off the virtual machine first). For example, do a blockdev on each cache device. Rescan the SCSI bus via 'echo "---"> /sys/class/scsi_host/host#/scan' or similar. Do another blockdev on each cache device. If the before and after results differ, run grow-a-disk.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the interface functions is tangible.

A given implementation of the disclosed subject matter is software written in a given programming language that runs on a server on an Intel-based hardware platform running an operating system such as Linux. As noted above, the interface may be implemented as well as a virtual machine or appliance, or in any other tangible manner.

While given components of the system have been described separately, one of ordinary skill will appreciate that some of the functions may be combined or shared in given instructions, program sequences, code portions, and the like.

In the preferred approach as described, filers do not communicate directly with one another but, instead, communicate through a hub-and-spoke architecture. Thus, the notification mechanism typically leverages the intermediary (e.g., NMC) for passing the queries and responses, as has been described. In an alternative embodiment, and depending on the underlying architecture, some filer-to-filer communication may be implemented.

Having described the subject matter, what is claimed is as follows:

1. An apparatus, comprising:
   one or more hardware processors;
   physical memory or storage associated with the one or more hardware processors for storing computer program code configured to be executed by the one or more hardware processors to provide storage for an enterprise, the computer program code configured as a filer associated with the enterprise, wherein the filer is configured to represent, to the enterprise, a local file system whose data is stored in an object store associated with a cloud-based storage service provider, the filer having a cache associated therewith, and wherein the cache is initially provisioned with a minimal configuration corresponding to a single disk RAID 0 or degraded RAID 4;
   the filer being further configured to receive an indication that a new disk is associated with a physical or virtual machine, and in response to receiving the indication, automatically re-organize data in the cache to utilize the new disk efficiently, thereby reshaping the cache;
   wherein provisioning the cache with the minimal configuration enables the reshaping to be performed without erasing and re-loading the data in the cache and without requiring a pause in service during reshaping.

2. The apparatus as described in claim 1 wherein the reshaping is implemented upon a first boot of the physical or virtual machine.

3. The apparatus as described in claim 1 wherein the filer automatically re-organizes data by:
   enumerating all free disks associated with the physical or virtual machine;
   assigning a smallest of the free disks as a copy-on-write (COW) disk; and
   performing an n-way stripe over all remaining free disks, using as much of those disks as possible.

4. The apparatus as described in claim 1 wherein the filer also is configured to grow a size of an existing disk in the cache.

* * * * *